No Printed Specification Available.
9278X
Goodell & Harvey
Loom.
Patented Dec. 2, 1835.
Fig 3.
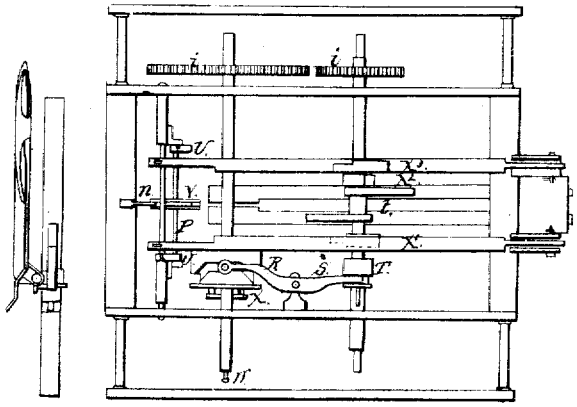
Fig 2.
Fig 1.
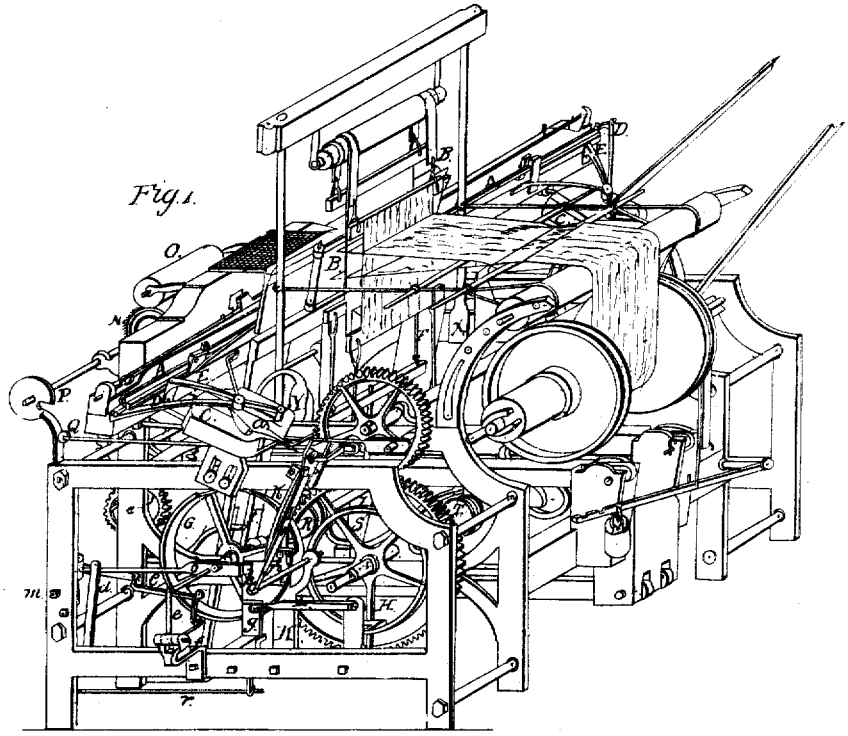

92'78X Dec 2. 1835 Dec 2, 1835 321.

Frederick Goodell (and) Thomas W Harvey of Ramapo New York

Letters Patent.

The Schedule referred to in these Letters Patent and making part of the same containing a description in the words of the said Frederick Goodell and Thomas W. Harvey themselves of their Improvement in the Power Loom for weaving Stock frames and for other purposes.

To all to whom these presents shall come. Be it known that We Frederick Goodell and Thomas W Harvey of Ramapo in the County of Rockland and State of New York have invented a new and useful improvement in the power loom for the purpose of weaving bristles hair or whale bone splints into a web of cotton linen or silk yarn used for neck stocks and the foundation of Neck Stocks called "Stock frames, and also for weaving such like materials or straw into a web for other purposes than Stocks or Stock frames and the following is a full and exact description thereof. First to a common power loom having a suitable frame yarn and cloth beams take up and stop motions lathe reed shuttle crank and cam shafts harness or heddles, heddle cams and picker fixtures driving pullies a pair of cog wheels connecting cranks and cam shafts cam and crank arms whip + roller &c. The same substantially as are in general use in the common power Loom for weaving plain cloth with the exception of compressing the width of the Loom to twenty inches or thereabouts between the frames we have appended an apparatus for placing the Bristles into the web by forceps or pincers a pair being placed on each side of the web back of the race board between the range of the shuttle and the reed. Secondly an apparatus for measuring the length of the Stock frames by stopping the bristle forceps after weaving 13/4 inches (more or less) Bristle Cloth, and then starting in motion again after weaving 8/4 inches more or less.) of plain cloth without bristle filling. Thirdly an apparatus for changing the movements of the picker from a shot of the shuttle with thread filling every stroke to one in two strokes of the lathe while weaving bristle cloth to wit, a shot of thread filling and a shot of bristles alternately but picks every beat of the lathe while weaving plain cloth without bristles for a description of which reference is had to the drawing annexed A.A. Fig 1 Bristle forceps or pincers attached to the lathe and move

92788 with it (see pincers on sectional drawing Fig 3 ) B.B. Fig 1. Bristle boxes at-
tached to the Lathe. F.F. Fig 1. are sides to which the bristle boxes are at-
tached and extend down to the bottom of the lathe swords being connected
thereto and works on the traverse cam. U.U Fig 2. D.D Fig 1. levers work-
ing in the transverse and straight grooves (opened by switch a ) at one end
and connected at the other end with the bristle forceps and sustained at the
fulcrum by an arm E.E. attached to the lathe, C.C. Fig 1. switch stands.
G Fig 1. is a transverse Cam on front shaft. I Fig 2. the side of the cam
is depressed 3/4 of an inch 1/4 of the circumference of the cam. the remain-
der of the cam is full working against the end of the plunger J. and gives motion to
switch a. A similar cam is placed on the end of said shaft on the op-
posite side of the loom. H Fig 1. is a similar cam on the back or
cam shaft with this difference. the depression is one half the circum-
ference of the cam, its use the same but being twice the speed of cam
G. on front shaft it changes the switches two to one and directs the
movement of the bristle forceps accordingly. L Fig 1. is a spring fastener
having two holes to fit upon a pin in stand K. one of the holes directs the
plunger J. to the cam H. the other hole directs the plunger J. to cam G.
I Fig 1. is a connecting lever lever between plunger J and switch a
and is attached to a stand K fastened to the outside frame piece. The lever
is thrown out from the frame at top by a Spring. M. Fig 1. Is an index
cam. A similar is at the other end of the shaft. N. Fig 1. Is an index
Roller over which the web passes and is in girt the length of a stock frame
O. Fig. 1. Is a top roller of metal to secure the cloth from slipping on
roller N. P. Fig 1. is an arm held up to cam M by a smart spring
( not shown in the drawing back of the outside frame and moves on pivot
at 2.2.2. Q Fig 1. is a rod affixed to arm P. on the other end of
said Rod is a dog fixture which when the arm P drops into the indent-
ation in the cam M. is brought forward outside of lever I and dogs
it and serves to hold open the straight groove of switch a. and stops the mo-
tion of the bristle forceps and determines the length that bristles are to be wov
into the stock frame. R Fig 1 & 2 Is a changing cam having a sliding
piece so constructed as to open a straight and a zig zag groove and

92787 works the clutch lever S. working in clutch T. which clutch connects by
sliding Rods t. t. fig 2. with the picker arms x x x. U U. Fig 2 are
cams on traverse shaft p. in the shape of hearts. having their eccentrics placed
on the shaft. the one reversed from the other and working against the end
of Slides F F. Their use is to traverse the bristle boxes up and down
in order to distribute the picks of the bristle pieces uniformly out of the bris-
tle boxes. V Fig 2 is a ratchet wheel on the same shaft and is moved by the station-
ary spring 12 fastened to the lower end rail and falling into the notch of the ratchet
wheel when the lathe is thrown back. and moving the traverse shaft when the lathe
beats up. P Fig 2 is a shaft called traverse shaft fastened by bearings to the
lower part of the lathe. W. Fig 2. Is a slide bolt in the shaft L. and reaches
to a crook bar X. which passes through the end of the bolt and a mortice in the
shaft. Y. Fig 1. is a support fastened to the inside frame. and the switch
stand and crooked up to allow the crank arms to play freely. L. Fig 2. Is
an extra shaft connected to the back or cam shaft by cog wheels i i and is two
to one slower than the cam shaft. h Fig 1. is an arm affixed by a pivot on the
inside of the outer frame and is held in by spring d. and connected with elbow
e and slide bolt. W. b Fig 1. is an arm affixed to arm P and connects to el-
bow e and serves to draw out the bolt W. when the arm P drops into the indent-
ation in the index cam M. and opens the straight groove arm R. Fig 2.
h. fig 1 is a latch held forward towards the arm b by a spring on stand g. and
is connected with the arm P. by the rod r. by passing through a hole in the
lower end of latch h. and is secured by a screw nut. When the arm P drops
into the indentation in cam M this latch falls back of the arm b and holds
it till the arm P is thrown back to periphery of the cam M by the passing
of the web. when done the spring d slides the bolt W. and opens the zig zag
groove in cam R Fig 2 and changes the motion of the shuttle from one to two
to wit. a shot of the thread shuttle every other beat of the lathe.

Use and operation. This Loom comprehends what we term a plain
and complex loom. By taking off the screw nut on rod r. Fig 1. which connects
it with latch h. the loom is plain in which case the slide bolt W is con-
stantly barred out by latch h. and the straight groove is held open and the
shuttle is kept going every beat of the lathe. By connecting them the complex

9278X loom is constituted whereby the zig zag groove above described is opened and the
shuttle motion is changed from a pick every beat to one every other beat of the
lathe during the space the loom is weaving bristles into the web and then chang
-ing to a pick every beat of the lathe while the bristle forceps are at rest.
The zig zag groove is formed to open 3/4 of the circumference of the cam R.
the remainder of the circle is stationary so that this shaft being two to one slow-
er in movement than the back or cam shaft. moves the clutch T Fig 2.
which connects with the three picker cams X. X. X. by the slide rods t t. in
a manner for the cams to move the picker treadles alternately first one and then
the other. The picker cams are securely affixed to the slide rods t t and slide
upon a feather affixed in the cam shaft. The cams marked 1 and 2 have
their eccentricities alike and are directly opposite to the one marked 3. The
switches a a. swing on a pivot and when thrown inward open a transverse
groove into which the lever D works and throws forward the forceps. When thrown
outward a straight groove is opened and the forceps are at rest. The movement
of the switches is indicated by the cams G. G. and H H. Fig 1. When the
Plunger f is set to cam G the straight groove of the switch is open 3/4 and
the traverse groove is open 1/4 of the time. By reversing this cam G. to the
one on the opposite end of shaft L fig 2 a motion will be given to the right
and left hand forceps alternately missing one pick of bristles every other
beat of the lathe. or if the cams G are set to agree with each other both
forceps pick at the same time at every fourth beat of the lathe. When
the plunger f is set to cams H the same effect is produced in every re-
spect with the exception of doubling the frequency of the picks of the forceps
the cam shaft being two to one in speed of the shaft L. Fig 2.
Operation of the Bristle forceps — When the lathe is thrown back and
the pincers are shot through the web into the Bristle boxes the button u
Fig 3 strikes a propelling piece and turns the button from its seat against
the lower arm of pincers marked v. Fig 3 when the spring part of the forceps
marked y shut and seize the bristles whereupon on the return of the lathe
to beat up, the forceps are brought back with the bristles till their bats have
reached the opposite selvage of the cloth when the lower arm of the forceps
rises on to a regulating piece and forces them open when they drop the bristles which are caught by crossing the shade of the web at that instant the forceps
being carried still farther back untill the button is turned into its seat again
by striking against said regulating piece That part of the forceps marked w.
Fig 3. Keys into the slide piece Z and serves as a standard for the forceps
and protects their points from entangling in the web by projecting beyond
the point of the forceps. The slide piece Z is seated upon the race board
of the lathe and is connected with lever D. Fig 1. The forceps and the shut-
tle pass through the web at the same instant and in different ranges
from each other in such a manner as not to interfere with each other. each
Bristle box is set opposite to its respective forceps a space of two inches be-
ing open to receive them the capacity of the boxes being 3/8 of an inch thick
and as high as desirable. and as long as the bristles, the bristles are kept down
by placing metal weights of the calibar of boxes over them. What we claim
as new and desire by Patent is. First the manner of working the bristle
forceps and their connexion including their combination with the switches
a. a. and traverse cams G and H. Secondly the manner of traversing
the bristle boxes. Thirdly the manner of changing the motion of the shut-
tle and its connexion with the index cam M. Fourthly the manner of
measuring off the length of the Stockframe, by the operation of the loom as
combined with the changing motion of the shuttle in claim third and in
connexion with the index roller and cam with the stop rod Q which dogs
the switches. Fifthly the use of two pair of bristle forceps to a loom a
pair on either side of the web. by which the bristles are placed butts and flanks
alternately into the web. Sixthly the manner of protecting the points
of the bristle forceps by the projecting piece marked w. Fig 3. it being
longer and broader than the points of the forceps. And Lastly to the gen-
eral arrangement of the above claimed parts in its adaptation to a common
Power Loom Witnesses
J. W. Freeborn
Henry W. Havens Frederick Goodell
Thos. W. Harvey (Patented 20 Oct 1835)

2528

(Drawing)